US008396795B2

(12) United States Patent
Mueller et al.

(10) Patent No.: US 8,396,795 B2
(45) Date of Patent: Mar. 12, 2013

(54) METHOD AND SOFTWARE APPLICATION AND SYSTEM FOR AUTOMATED BILL PROCESSING

(75) Inventors: Thomas Mueller, Wiesloch (DE); Jurgen Köhling, Hockenheim (DE)

(73) Assignee: SAP AG, Walldorf (DE)

( * ) Notice: Subject to any disclaimer, the term of this patent is extended or adjusted under 35 U.S.C. 154(b) by 1849 days.

(21) Appl. No.: 10/893,872

(22) Filed: Jul. 20, 2004

(65) Prior Publication Data

US 2005/0049946 A1  Mar. 3, 2005

(30) Foreign Application Priority Data

Jul. 21, 1920 (EP) .................................. 03015692

(51) Int. Cl.
*G06Q 40/00* (2012.01)
(52) U.S. Cl. ........................................... 705/40; 705/39
(58) Field of Classification Search ................... 705/40, 705/39
See application file for complete search history.

(56) References Cited

U.S. PATENT DOCUMENTS

| | | | |
|---|---|---|---|
| 5,832,460 A | 11/1998 | Bednar et al. | |
| 5,884,288 A | 3/1999 | Chang et al. | |
| 5,943,656 A * | 8/1999 | Crooks et al. | 705/30 |
| 5,956,700 A | 9/1999 | Landry | |
| 5,963,925 A * | 10/1999 | Kolling et al. | 705/40 |
| 6,292,789 B1 | 9/2001 | Schutzer | |
| 7,240,031 B1 | 7/2007 | Kight et al. | |
| 2002/0002536 A1 * | 1/2002 | Braco | 705/40 |
| 2002/0002537 A1 | 1/2002 | Bastiansen | |
| 2002/0023055 A1 | 2/2002 | Antognini et al. | |
| 2002/0087469 A1 | 7/2002 | Ganesan et al. | |
| 2005/0049947 A1 | 3/2005 | Mueller et al. | |

OTHER PUBLICATIONS

Office Action mailed Aug. 20, 2007, from U.S. Appl. No. 10/893,873.
Final Office Action mailed Jan. 22, 2008, from U.S. Appl. No. 10/893,873.
Office Action mailed Jun. 26, 2008, from U.S. Appl. No. 10/893,873.
Final Office Action mailed Dec. 11, 2008, from U.S. Appl. No. 10/893,873.
Office Action mailed Apr. 28, 2009, from U.S. Appl. No. 10/893,873.

* cited by examiner

*Primary Examiner* — Thomas Dixon
*Assistant Examiner* — Benjamin S Fields
(74) *Attorney, Agent, or Firm* — Finnegan, Henderson, Farabow, Garrett & Dunner LLP

(57) ABSTRACT

Methods and systems are provided for processing one or more bills of a biller.
Methods and systems may present a request to pay one or more of a set of one or more bills in total or in part on a site of a computer network,
A selection of the one or more bills from a customer may be received, said selection responding to said request via said site.
Method and system may generate an electronic advice of settlement of the selected bills comprising an ID, and
present the electronic advice of settlement and/or the ID to the customer or to a payment service provider.

18 Claims, 3 Drawing Sheets

METHOD AND SOFTWARE APPLICATION AND SYSTEM FOR AUTOMATED BILL PROCESSING

TECHNICAL FIELD

The present invention generally relates to electronic data processing. More particularly, the invention relates to methods, computer program products and systems for automated bill presentment and, in one example, internet based bill presentment and payment.

BACKGROUND

If a customer pays two or more bills from a biller by way of a self-initiated payment method using a payment order, which can be implemented by a paper-based payment carrier (e.g., cheque), a bank transfer, or electronically via bank transfer by online- or internet banking in one amount, the biller has the problem of identifying which partial amount of the total incoming payment amount belongs to which bill. In such cases, particularly if a plurality of bills are paid with a single payment, it is common practice for customers to send a so-called "advice of settlement" to the biller parallel to the payment. The advice of settlement comprises a detailed list of the bills to be paid including the respective (partial-) amounts. Such advice of settlement can have a volume of a few hundred pages in cases of business relationships, in which a large company is on the customer side. The advice of settlement is sent as a hard copy to the biller and the customer references to the particular advice of settlement on the payment order.

This procedure has several disadvantages: The customer has to create the advice of settlement, either electronically (by means of his business software) or by hand; he has to send it to the biller (either by normal mail or by email), thereby addressing it to the correct address and the responsible person, which is often very difficult; and he has to ensure that the advice of settlement reaches the biller at about the same time as the payment. The biller on the other side has to process the incoming advice of settlement. This means that he has to enter the data into his business software system. In order to allow an automatic processing of the incoming payment, the data must be entered before the payment is made. In case the customer does not send any advice of settlement—or it arrives far too late—the biller has the problem to assign the correct bills to the amount or partial amounts. This causes complex queries to the customer.

Another issue is that modern business software payments, which cannot be exactly assigned to specific bills, are often automatically distributed to open items. This often causes erroneous bookings with subsequent cancellation bookings, which waste storage of the computer system and strain performance.

Thus, there is a need for a method, software application and/or data processing system providing a more efficient solution of at least some of the problems described above. Particularly, it may be desirable to provide a software application having a mechanism for enabling a better processing of bills or payments in combination with an advice of settlement.

The above description is based on the knowledge of the present inventors and not necessarily that known in the art.

SUMMARY

Methods and systems consistent with the present invention may provide a method for processing one or more bills of a biller. Methods and systems may be provided for presenting a request to pay one or more of a set of one or more bills in total or in part on a site of a computer network. Methods and systems may receive a selection of the one or more bills from a customer, said selection responding to said request via said site. An electronic advice of settlement of the selected bills comprising an ID may be generated. Methods and systems may present the electronic advice of settlement and/or the ID to the customer or to a payment service provider.

One aspect consistent with the present invention includes providing a computer system for processing one or more bills of a biller. The computer system may comprise a memory having program instructions; input means for receiving and entering data; output means for sending and presenting data; storage means for storing data; and a processor responsive to the program instructions. Consistent with embodiments of the present invention, the program instructions may direct the processor to present a request to pay one or more of a set of one or more bills in total or in part on a site of a computer network. The instructions may also direct the processor to receive a selection of the one or more bills from a customer, said selection responding to said request via said site, generate an electronic advice of settlement of the selected bills comprising an ID, and present the electronic advice of settlement and/or the ID to the customer or to a payment service provider.

Applying the method, e.g. by using the system, is insofar advantageous as on the biller side a lot of work regarding the assignment of incoming payments to the underlying bills is avoided and—at the same time—the biller's computer system computer system can run more efficiently, due to a lesser waste of storage space and a better process time. On the customer side, the generation of advice of settlement is no longer necessary, thus saving work load and time of the customer and its computer system as well.

Embodiments consistent with the invention are further directed to a computer system, a computer program, a computer readable medium and a carrier signal, each comprising program code or instructions for processing one or more bills of a biller according to the above method and its embodiments. Such instructions cause a computer system to perform the cited method, if the instructions are carried out on a computer system.

Such computer program can be installed as one or more programs or program modules on different hardware systems (computers or computer systems), and run separately and independently of each other, in their entirety being capable of performing the inventive method and its embodiments. The different systems may be connected in the form of a network to communicate with each other.

The various embodiments can include and/or exclude different aspects, features and/or advantages, where applicable. In addition, various embodiments can combine one or more aspects or features of other embodiments, where applicable.

It is understood that both, the foregoing general description and the following detailed description, are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this specification, illustrate embodiments consistent with the invention and, together with the description, explain the principles of the invention. In the drawings.

FIG. 1b is an exemplary block diagram of a computer system connectable to the computer system of FIG. 1a.

DETAILED DESCRIPTION

Figure 1A:
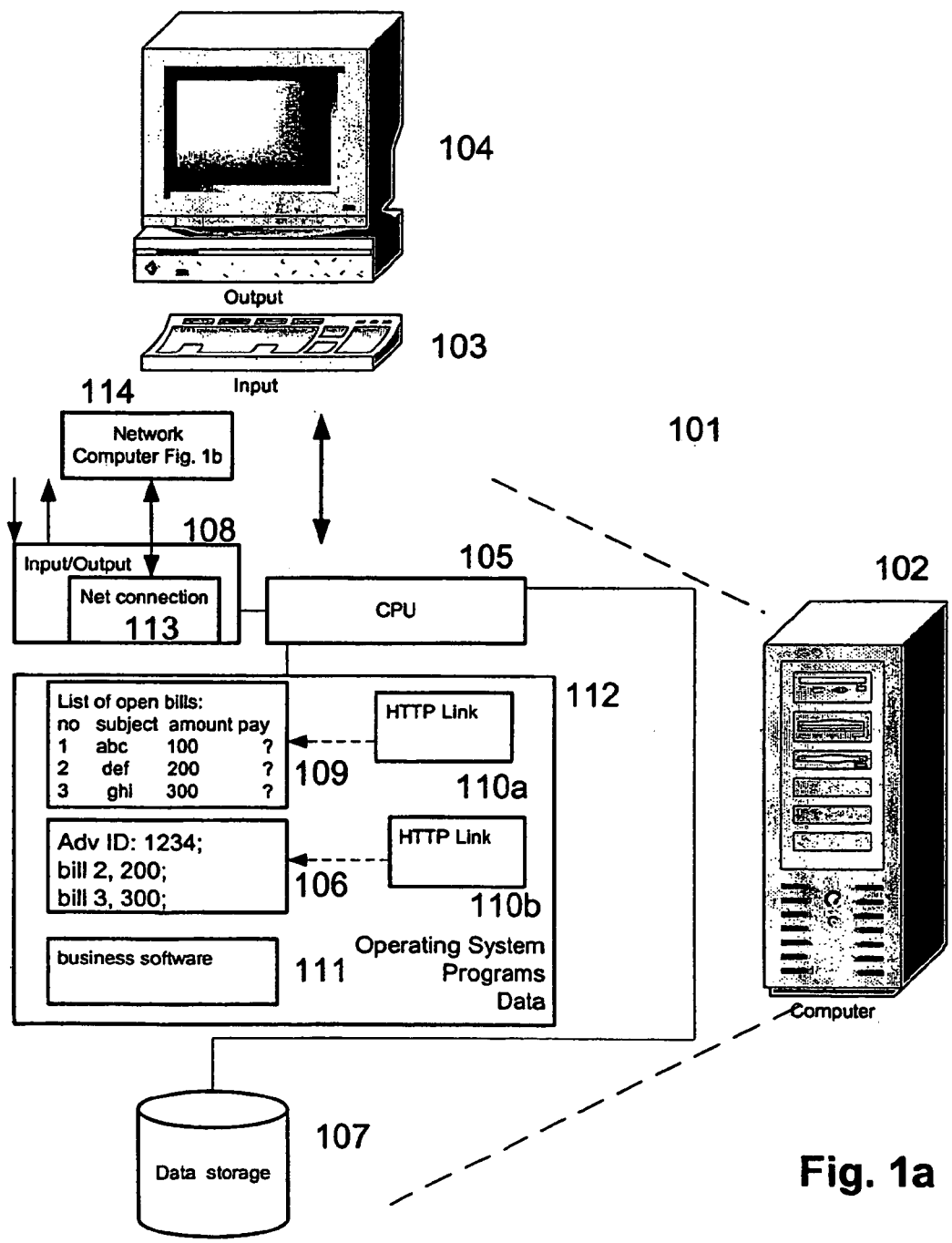
FIG. 1a is a schematic block diagram of an implementation of the claimed method by means of a computer system.

Computer systems and program are closely related. As used herein, phrases, such as "the computer provides", "the program provides or performs specific actions", and "a user performs a specific action" refer to actions by a computer system that may be controlled by a program. These phrases may also express that the program or program module is designed to enable the computer system to perform the specific action or to enable a user to perform the specific action by means of a computer system.

It should be understood that the term "presentment" as used herein does not only include the specialized definition normally associated with commercial paper, i.e. the production on a negotiable instrument to a drawee. Rather, the term refers to providing information via electronic means as well. This electronic presentment may, for example, take place through the use of an internet- or intranet website or via email or SMS, e.g. by making a web site accessible to one or more persons.

The terms used herein shall have their usual meaning in the context of the field of data processing unless defined otherwise. Particularly, a computer system can be a stand alone computer such as a PC, a laptop, a series of computers connected as a network, e.g. a network within a company, or a series of computers connected via the internet.

Methods of the present invention may be implemented by a computer system connected to the internet, thus forming part of a network. Said computer system may comprise one or more program modules for performing method steps. The presentment of the list of bills by the biller can be implemented by an internet web site. This web site can be accessed by a customer, e.g. after an authentication step. The internet web site can be implemented as is known in the art, in the form of a XML- or HTML file, in which the relevant bill data are included. A link to that file, preferably a hyperlink, can be generated and presented to the customer. The customer, connected to an intranet or to the internet can apply the link, open the web site by means of a web browser, which can be integrated in the business software of the customer for data import and which can present the content of the file on the display. The customer can then select one or more bills, e.g. by checking of check boxes presented to him by the web browser. When applying a "send" function or button presented by the web browser, the web browser sends the data (i.e., information regarding which bills are selected) back to the computer system of the biller, who receives a selection of the one or more bills. The computer system of the biller then automatically generates an electronic advice of settlement, in which data of the selected bills are included. Typically, bill number, amount, bill subject, bill date and the like can be used. These data can be taken from a business database of the biller. Further, an identifier (ID) is created and assigned to the electronic advice of settlement. This ID can be marked as such, in order to allow its automatic import into the business or payment software of the customer. Such electronic advice of settlement can be implemented e.g. as an XML-HTML file as well. Similarly, a link or hyperlink to that electronic advice of settlement can be created and presented to the customer. The ID can be incorporated into the advice of settlement and/or into a web page and/or into a subsequent web page.

Alternatively, the customer thus can download the electronic advice of settlement, automatically import the ID into his payment system and transfer a payment carrier comprising the ID to his payment service provider. Alternatively, the ID can be included in a separate file. However, the further process of down loading and accessing is analogous.

Alternatively to presenting the ID to the customer, the ID can be presented directly to a payment service provider, which can be selected by the customer via a list or which can be preselected in the computer system on agreement with the customer. Pre-requisite is that the selected payment service provider is authorized by the customer to conduct payments on his behalf. This is typically the case if the payment service provider is the customer's house bank. In this scenario, the customer does not even need to know of the existence of the advice of settlement and the ID. The biller's computer system transfers customer data (address, account no., etc.), payment data (currency, amount, etc.) biller data (bank, account no., etc.) and the ID to the selected payment service provider.

In order to present the ID to a customer or to a payment service provider, the ID can e.g. be incorporated into the use section of a payment order, e.g. manually on a paper form, or electronically on an online- or internet banking form. The incorporation into the electronic form can be performed manually or automatically by a software application.

Consistent with embodiments of the present invention, editable data fields may be provided (e.g., included in a site of a computer network). This can be implemented by a web page, which provides editable data fields to a user. The editable data fields can be coupled with tables from which predefinable values for the respective data field can be selected and entered into the respective data field. The user, e.g. a customer, can enter comments into the fields or can specify partial amount he wants to pay or can correct erroneous data of the bills presented.

Consistent with embodiments of the present invention, advice of settlement on the basis of the selected and amended bills may be generated.

This step is, e.g., accomplished when a user decides to pay only a partial amount of a selected bill. The biller computer system then uses the amount sent to it by the customer's system and includes it in the electronic advice of settlement.

Methods and systems consistent with embodiments of the present invention may receive a payment, referenced by an ID of an electronic advice of settlement.

Embodiments consistent with the present invention may provide methods and systems for presenting one or more payment service providers for selection by the customer. After having selected the bills, the customer can chose from a table a payment service provider, e.g. a bank of which he is a customer, he wants to use for the payment of the selected bills. The computer system of the biller then creates from the selected bills a set of payment data, the advice of settlement and its ID and sends the payment data, the ID together with biller and customer data to the payment service provider selected by the customer for further processing. The payment service provider processes the payment to the bank of the biller, from which the payment information including the ID is sent to the business software system of the biller, which then can automatically assign the paid amount to the respective bills by the ID and the associated advice of settlement generated before.

Processors suitable for the execution of a computer program include, by way of example, both general and special purpose microprocessors, and any one or more processors of any kind of a digital computer. Generally, a processor will receive instructions and data from a read-only memory and/or a random access memory. A computer may include a processor for executing instructions and one or more memory devices for storing instructions and data. Generally, a computer will also include, and/or be operatively coupled to receive data from and/or transfer data to, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

Reference will now be made in detail to the principles of the invention and its embodiments by an explanation on the basis of a data processing process, examples of which are illustrated in the accompanying drawings. Examples mentioned therein are for explanatory purpose only and shall not limit the invention in any way.

FIG. 1a shows one example of an implementation of an embodiment consistent with the invention: A computer system with program modules for performing the method and its embodiments described in this specification. FIG. 1a shows a computer system 101 comprising a computer 102 having a CPU 105, a working storage 112 (memory), in which an operating system, data and software applications are stored for processing by CPU 105. The software applications comprise a business software application 111 for performing the method described. Software application 111 can comprise one or more program modules for performing specific tasks.

Computer System 101 further comprises input means 103; output means 104 for interaction with a user, e.g. for starting the program modules and/or for data input; and general input/output means 108, including a net connection 113, for sending and receiving data (e.g., data on billing information, bills, payment orders, customer and biller master data, etc.) via an intranet or the internet. A plurality of computer systems 101 can be connected via the net connection 113 in the form of a network. In such a case, each of the modules of the business software 111 can be installed and run separately and independently on the respective network computers. In this case, the network computers 114 can be used as further input/output means, including the use as further storage locations. Net connection 113 further allows a connection with a computer system 114 of a customer. Computer system 101 further comprises a first storage means 107, in which business and billing data of the customer(s) are stored.

Figure 1B:
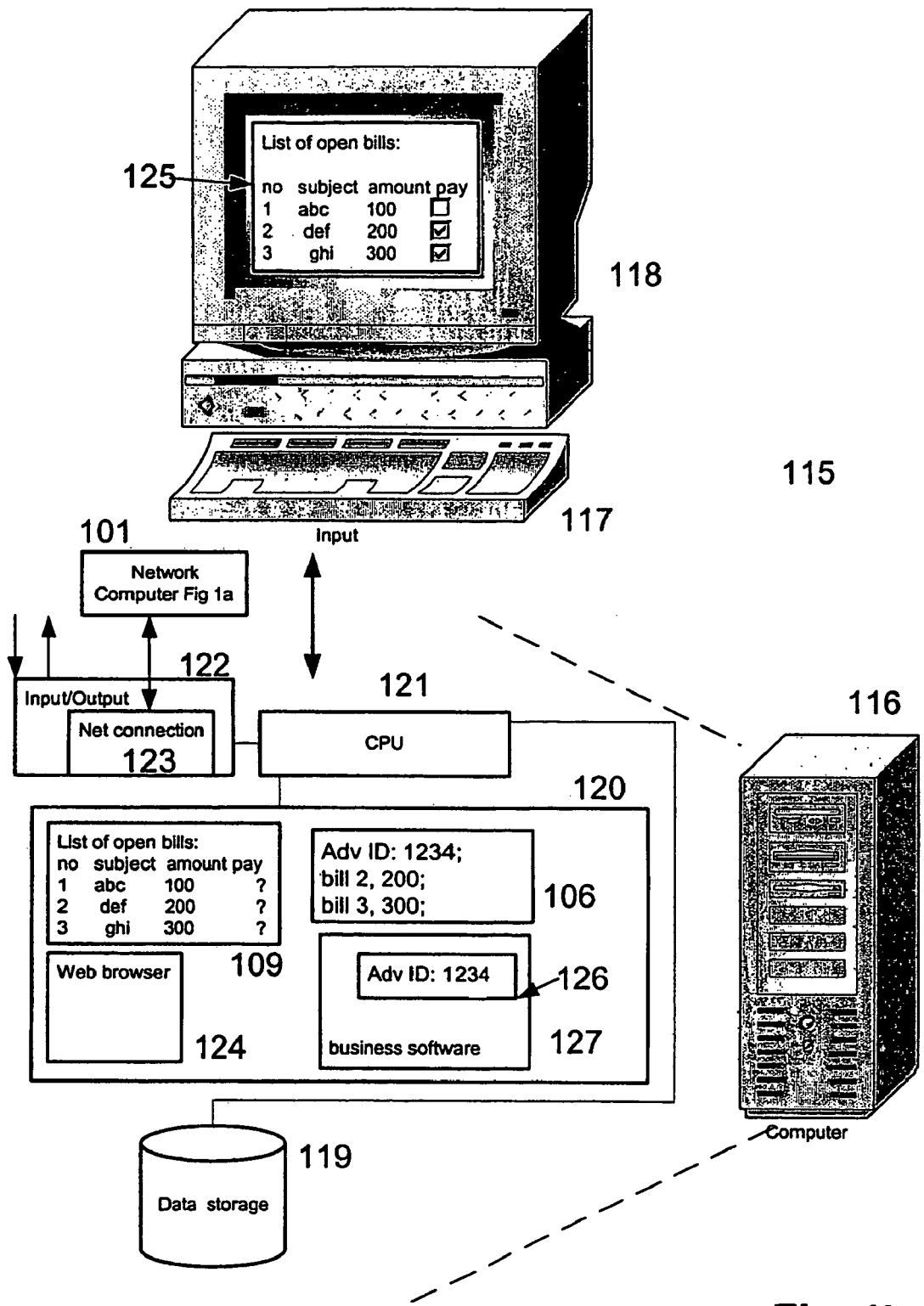

FIG. 1b illustrates a customer-based computer system 115 for interaction with the computer system 101 of a biller. Computer system 115 comprises computer 116, CPU 121, memory 120, input 117 and output 118 for interaction with a user, mass storage 119, general input/output 122 for data exchange, including a net connection 123.

Figure 2:
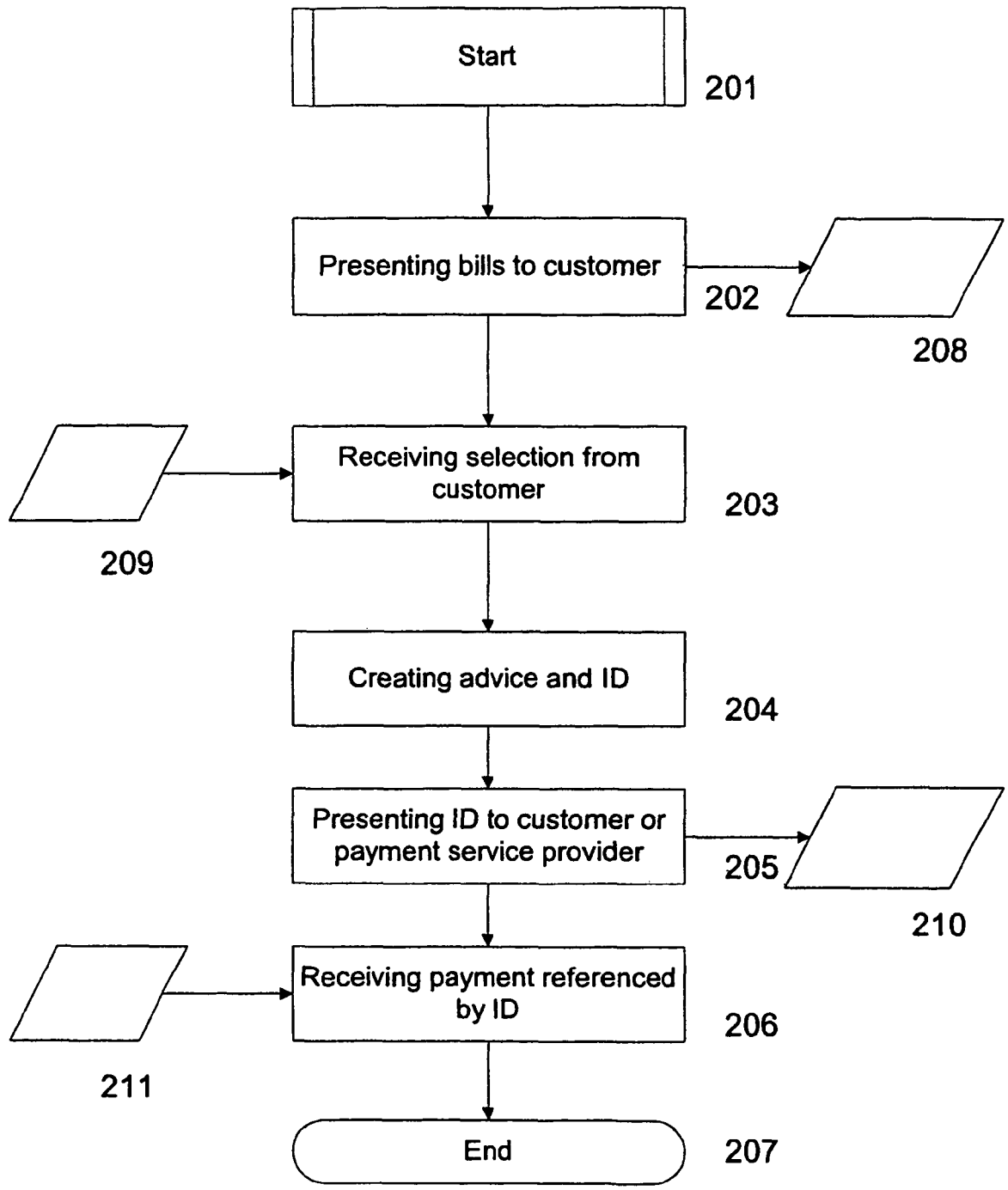
FIG. 2 is flow diagram of the method consistent with the principles described in this specification.

FIG. 2 shows a flow diagram of the process described in the following sections with reference to the three figures.

After starting (step 201), a structured document 109 (FIG. 1a) containing a list of open bills and relevant billing data (e.g., bill no, subject, amount, date, etc.) is created by business application 111. The structured document 109 can be, for example, a XML- or HTML file. It further comprises information to enable a web browser to display the bill data and selecting means on a screen. Further, a HTTP link 110a, pointing to the document 109 is created. In order to present the list of open bills to a customer, the link 110a, 208 is sent to the customer (step 202). The customer receives and applies the link by means of computer system 115 and web browser 124. Web browser 124 accesses via the net connection 123 the document 109 and displays its content, particularly the list of bills, as a web page 125 on the monitor 118. The customer can select one or more bills by checking the presented check boxes in the "pay" column of the page 125. In this example, the customer intends to pay bills nos. 2 and 3. After applying a "send" function (not shown), the browser 124 sends the modified bill data (selected bills) 209 back to the computer system 101. System 101 receives the selection 209 from the customer 203 and creates a advice of settlement 106 and an ID therefrom (step 204). The advice of settlement can have the form of an XML- or HTML file as well. It contains an ID, "1234" in the example, and billing data of the selected bills. The ID is incorporated into the document 109, and e.g. upon the refresh function of the web browser 124 is displayed on the output 118. Another possibility is to incorporate the ID into a subsequent web page (210) and thus present it to the customer (205). The customer can then transfer the ID manually into his payment carriers. Alternatively, the ID can be stored in a separate structured document. Further, a link 110b can be created, which points to the advice of settlement 106 or the document of the ID. In order to present the advice of settlement and/or the ID to the customer, the link 110b, is sent to the customer. The ID is then presented to the customer through the application of the link by the customer via web browser 124, the web browser accesses the corresponding file 210 and display the ID on the monitor. The ID can then automatically or manually be entered into a payment order as a reference to the advice of settlement. Payment order can be implemented by a paper based payment carrier or an electronic payment form. The payment order is sent to a payment service provider for further processing. Accordingly, the biller receives (step 206) the payment via his banking institute, whereby a payment notice 211 contains the ID, which references to the advice of settlement generated before.

Modifications and adaptations of the present invention will be apparent to those skilled in the art from consideration of the specification and practice of the invention disclosed herein. The foregoing description has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A method for processing one or more bills of a biller, comprising:
   presenting, to a customer, a request to pay one or more of a set of one or more bills in total or in part on a site of a computer network;
   receiving from the customer, by at least one processor, a selection of the one or more bills, said selection responding to said request via said site;
   receiving from the customer, by the at least one processor, an amount to be paid entered by the customer for each of the selected bills;
   generating, by the at least one processor, in response to the selection, an electronic advice of settlement, wherein the electronic advice of settlement comprises a list of the selected bills and the amount to be paid entered by the customer for each of the selected bills;
   generating, by the at least one processor, an identifier of the electronic advice of settlement;
   presenting, prior to settlement of the selected bills, the identifier of the electronic advice of settlement to the customer for inclusion with a payment order; and
   receiving, from the customer, the payment order comprising the identifier of the electronic advice of settlement.

2. The method of claim 1, further comprising:
   providing editable data fields via the site.

3. The method of claim 1 or 2, further comprising:
   generating the advice of settlement on the basis of the selected and amended bills.

4. The method of claim 1 or 2, further comprising:
   receiving the payment, referenced by the identifier of the electronic advice of settlement.

5. The method of claim 1 or 2, further comprising:
   presenting one or more payment service providers for selection by the customer.

6. A computer system for processing one or more bills of a biller, comprising:
   a memory having program instructions;
   input means for receiving and entering data;
   output means for sending and presenting data;
   storage means for storing data; and
   a processor responsive to the program instructions to:
   present, to a customer, a request to pay one or more of a set of one or more bills in total or in part on a site of a computer network,
   receive from the customer, a selection of the one or more bills, said selection responding to said request via said site,
   receive from the customer, an amount to be paid entered by the customer for each of the selected bills;
   generate, by the biller, in response to the selection, an electronic advice of settlement, wherein the electronic advice of settlement comprises a list of the selected bills and the amount to be paid entered by the customer for each of the selected bills;
   generate, by the biller, an identifier of the electronic advice of settlement;
   present, prior to settlement of the selected bills, the identifier of the electronic advice of settlement to the customer for inclusion with a payment order; and
   receive, from the customer, the payment order comprising the identifier of the electronic advice of settlement.

7. The computer system of claim 6, wherein the site includes editable data fields.

8. The computer system of claim 6 or 7, wherein the processor is responsive to instructions to generate the advice of settlement on the basis of the selected and amended bills.

9. The computer system of claim 6 or 7, wherein the processor is responsive to instructions to receive the payment, referenced by the identifier of the electronic advice of settlement.

10. The computer system of claim 6 or 7, further comprising:
    presenting one or more payment service providers for selection by the customer.

11. A computer readable medium comprising executable instructions for processing one or more bills of a biller, the instructions, when executed by a computer system, causing the computer system to:
    present, to the customer, a request to pay one or more of a set of one or more bills in total or in part on a site of a computer network;
    receive from the customer a selection of the one or more bills from the customer, said selection responding to said request via said site;
    receive from the customer, an amount to be paid entered by the customer for each of the selected bills;
    generate, by the biller, in response to the selection, an electronic advice of settlement, wherein the electronic advice of settlement comprises a list of the selected bills and an amount to be paid entered by the customer for each of the selected bills;
    generate, by the biller, an identifier of the electronic advice of settlement;

present, prior to settlement of the selected bills, the identifier of the electronic advice of settlement to the customer for inclusion with a payment order; and receive, from the customer, the payment order comprising the identifier of the electronic advice of settlement.

12. The computer readable medium of claim 11, wherein the instructions cause the computer system to provide editable data fields in the site.

13. The computer readable medium of claim 11 or 12, wherein the instructions cause the computer system to generate the advice of settlement on the basis of the selected and amended bills.

14. The computer readable medium of one or more of claim 11 or 12, wherein the instructions cause the computer system to receive the payment, referenced by the identifier of the electronic advice of settlement.

15. The computer readable medium of one or more of claim 11 or 12, wherein the instructions cause the computer system to present one or more payment service providers for selection by the customer.

16. The method of claim 1, wherein the payment order is received by a payment service provider from the customer.

17. The computer system of claim 6, wherein the payment order is received by a payment service provider from the customer.

18. The computer readable medium of claim 11, wherein the payment order is received by a payment service provider from the customer.

* * * * *

UNITED STATES PATENT AND TRADEMARK OFFICE
CERTIFICATE OF CORRECTION

PATENT NO. : 8,396,795 B2  
APPLICATION NO. : 10/893872  
DATED : March 12, 2013  
INVENTOR(S) : Thomas Mueller and Jurgen Köhling Page 1 of 1

It is certified that error appears in the above-identified patent and that said Letters Patent is hereby corrected as shown below:

Title Page, item (30) Foreign Application Priority Data:

"Jul. 21, 1920 (EP).................. 03015692"

should be

--Jul. 21, 2003 (EP).................. 03015692--

Signed and Sealed this  
Fourteenth Day of May, 2013

Teresa Stanek Rea  
*Acting Director of the United States Patent and Trademark Office*